(12) United States Patent
Skurkis et al.

(10) Patent No.: US 9,746,044 B1
(45) Date of Patent: Aug. 29, 2017

(54) RESETTABLE SENSOR ASSEMBLY AND SYSTEM

(71) Applicant: GM GLOBAL TECHNOLOGY OPERATIONS LLC, Detroit, MI (US)

(72) Inventors: Richard J. Skurkis, Lake Orion, MI (US); Paul W. Alexander, Ypsilanti, MI (US); Nancy L. Johnson, Northville, MI (US); Jason F. Laws, Milford, MI (US); Nicholas W. Pinto, IV, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/130,199

(22) Filed: Apr. 15, 2016

(51) Int. Cl.
| | |
|---|---|
| *G01K 1/14* | (2006.01) |
| *H01H 37/32* | (2006.01) |
| *F16D 66/00* | (2006.01) |
| *F16D 65/18* | (2006.01) |
| *F16D 55/225* | (2006.01) |

(52) U.S. Cl.
CPC ......... *F16D 66/00* (2013.01); *F16D 55/225* (2013.01); *F16D 65/18* (2013.01); *F16D 2066/001* (2013.01)

(58) Field of Classification Search
CPC ...... H01H 37/323; G01D 11/245; H05K 5/02; H05K 7/14
USPC ............. 73/514.09, 514.16, 514.31, 514.35; 200/61.45, 61.53
See application file for complete search history.

(56) References Cited

U.S. PATENT DOCUMENTS

| | | | | |
|---|---|---|---|---|
| 4,922,065 | A * | 5/1990 | Behr | B24B 49/105 |
| | | | | 200/61.45 M |
| 5,326,945 | A * | 7/1994 | Gotoh | G01P 15/135 |
| | | | | 200/61.45 M |
| 5,440,084 | A * | 8/1995 | Fuse | H01H 35/147 |
| | | | | 200/61.45 M |
| 5,770,792 | A * | 6/1998 | Nakada | H01H 35/147 |
| | | | | 335/205 |
| 7,081,693 | B2 * | 7/2006 | Hamel | B60C 23/0411 |
| | | | | 307/151 |
| 2016/0313189 | A1 * | 10/2016 | Skurkis | H01H 37/00 |
| 2016/0314918 | A1 * | 10/2016 | Skurkis | G01D 11/245 |

* cited by examiner

*Primary Examiner* — Christopher Schwartz
(74) *Attorney, Agent, or Firm* — Quinn IP Law

(57) ABSTRACT

A resettable sensor assembly includes an elongate valve body having a longitudinal axis and defining a cavity therein. A housing is at least partially disposed within a cooperates with the elongate valve body and includes at least one electrical contact. A support member disposed within the elongate valve body cavity cooperates with a plate to communicate with the at least one electrical contact. An actuator element configured for translating the plate along the axis between a first position in which the plate contacts the at least one electrical contact and a second position in which the plate is spaced apart from the at least one electrical contact. The element is formed from a shape memory alloy that is transitionable between an austenite crystallographic phase and a martensite crystallographic phase in response to a thermal activation signal to thereby translate the plate between the first position and the second position.

20 Claims, 4 Drawing Sheets

RESETTABLE SENSOR ASSEMBLY AND SYSTEM

TECHNICAL FIELD

The disclosure relates to a resettable sensor assembly and a resettable sensor system.

BACKGROUND

Manufacturing equipment, vehicles, and many types of devices are often subject to temperature changes during operation. For example, manufacturing operations may include heating equipment such as ovens, dryers, grinders, and the like that may repeatedly cycle between temperature extremes. Likewise, vehicles such as automobiles, railcars, aircraft, and earth movers may include one or more components, such as gear boxes, brakes, fluid containers, axles, and bearings that may be subjected to varying temperatures during operation.

Similarly, electrically-powered equipment, such as electric motors, timer switches, welding transformers, and welding guns and mechanical equipment such as pulleys, elevators, and augers may be subject to frictional heating during operation. Processing equipment such as reactors, ovens, coolant pipes, conduits, valves, and conveyors may likewise operate in varying environmental and thermal conditions.

Such equipment, vehicles, and devices may be expected to operate with minimal operator attention or oversight. For example, devices may be shrouded by shields or casings during operation, and equipment may be located where physical and/or visual access is limited.

SUMMARY

A resettable sensor assembly includes an elongate valve body having a longitudinal axis and defining a cavity therein. The elongate valve body includes a first plurality of threads disposed about the longitudinal axis. A housing is at least partially disposed within and cooperates with the elongate valve body and includes at least one electrical contact in communication with the housing. A support member is disposed within the elongate valve body cavity and is translatable within the cavity along the longitudinal axis.

A plate cooperates with the support member disposed within the elongate valve body cavity and is movable to communicate with the at least one electrical contact. An actuator element configured for translating the plate along the longitudinal axis between a first position in which the plate contacts the at least one electrical contact and a second position in which the plate is spaced apart from the at least one electrical contact. The actuator element is formed from a shape memory alloy that is transitionable between an austenite crystallographic phase and a martensite crystallographic phase in response to a thermal activation signal to thereby translate the plate between the first position and the second position.

The actuator element operatively engages the elongate valve body and the support member and is configured as a first resilient member. The actuator element translates the support member along the longitudinal axis in a first direction as the actuator element transitions from the austenite crystallographic phase to the martensite crystallographic phase.

A second resilient member is disposed about the housing and in contact with the support member. The second resilient member translates the support member along the longitudinal axis in a second direction that is opposite the first direction as the actuator element transitions from the martensite crystallographic phase to the austenite crystallographic phase. The housing includes a plurality of electrical contacts spaced apart from one another.

The plate is disposed in contact with the plurality of electrical contacts when the plate is disposed in the first position, and is spaced apart from the plurality of electrical contacts when the plate is disposed in the second position. The resettable sensor assembly includes a wireless transmitter electrically connected to the at least one electrical contact and a battery electrically connected to the wireless transmitter. The first plurality of threads of the elongate valve body are sized to releasably engage a second plurality of threads disposed in a hole of a brake caliper of a vehicle braking system.

In another embodiment of the disclosure, a resettable sensor assembly for use with a vehicle braking system includes an elongate valve body having a longitudinal axis and defining a cavity therein. The elongate valve body includes a first plurality of threads disposed about the longitudinal axis. A housing is at least partially disposed within and cooperating with the elongate valve body including at least one electrical contact.

A support member is disposed within the elongate valve body cavity and translatable within the cavity along the longitudinal axis. A plate cooperates with the support member disposed within the elongate valve body cavity movable to communicate with the at least one electrical contact. An actuator element having a first resilient member to operatively engage the elongate valve body and the support member configured for translating the plate along the longitudinal axis between a first position in which the plate contacts the at least one electrical contact and a second position in which the plate is spaced apart from the at least one electrical contact. The actuator element is formed from a shape memory alloy that is transitionable between an austenite crystallographic phase and a martensite crystallographic phase in response to a thermal activation signal to thereby translate the plate between the first position and the second position.

The actuator element operatively engages the elongate valve body and the support member and is configured as a first resilient member. The actuator element translates the support member along the longitudinal axis in a first direction as the actuator element transitions from the austenite crystallographic phase to the martensite crystallographic phase.

A second resilient member is disposed about the housing and in contact with the support member. The second resilient member translates the support member along the longitudinal axis in a second direction that is opposite the first direction as the actuator element transitions from the martensite crystallographic phase to the austenite crystallographic phase. The housing includes a plurality of electrical contacts spaced apart from one another.

The plate is disposed in contact with the plurality of electrical contacts when the plate is disposed in the first position, and is spaced apart from the plurality of electrical contacts when the plate is disposed in the second position. The resettable sensor assembly includes a wireless transmitter electrically connected to the at least one electrical contact and a battery electrically connected to the wireless transmitter. The first plurality of threads of the elongate valve body are sized to releasably engage a second plurality of threads disposed in a hole of a brake caliper of a vehicle braking system.

The above features and advantages and other features and advantages of the present disclosure will be readily apparent from the following detailed description of the preferred embodiments and best modes for carrying out the present disclosure when taken in connection with the accompanying drawings and appended claims.

DETAILED DESCRIPTION

Figure 1:
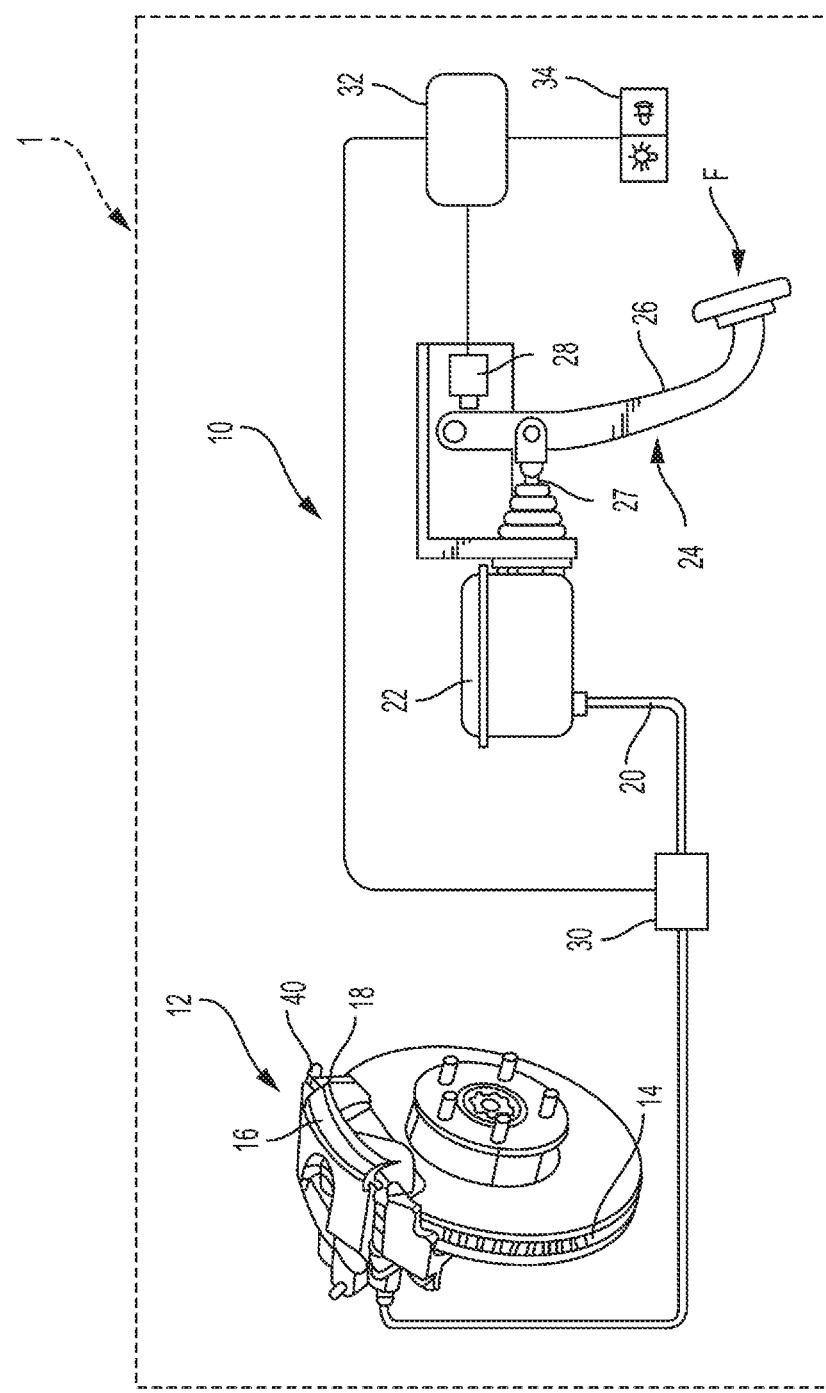
FIG. 1 is a schematic illustration of a motor vehicle braking system employing one or more disc brakes.

Reference will now be made in detail to several embodiments of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Referring to the drawings, wherein like reference numbers correspond to like or similar components throughout the several Figures, FIG. 1 shows a schematic view of a motor vehicle 1 which includes a braking system 10. Braking system 10 is configured to slow or stop the motion of the vehicle 1. It is understood that the vehicle 1 may be any mobile platform, such as an airplane, all-terrain vehicle (ATV), boat, personal movement device, robot and the like to accomplish the purposes of this disclosure.

Figure 2:
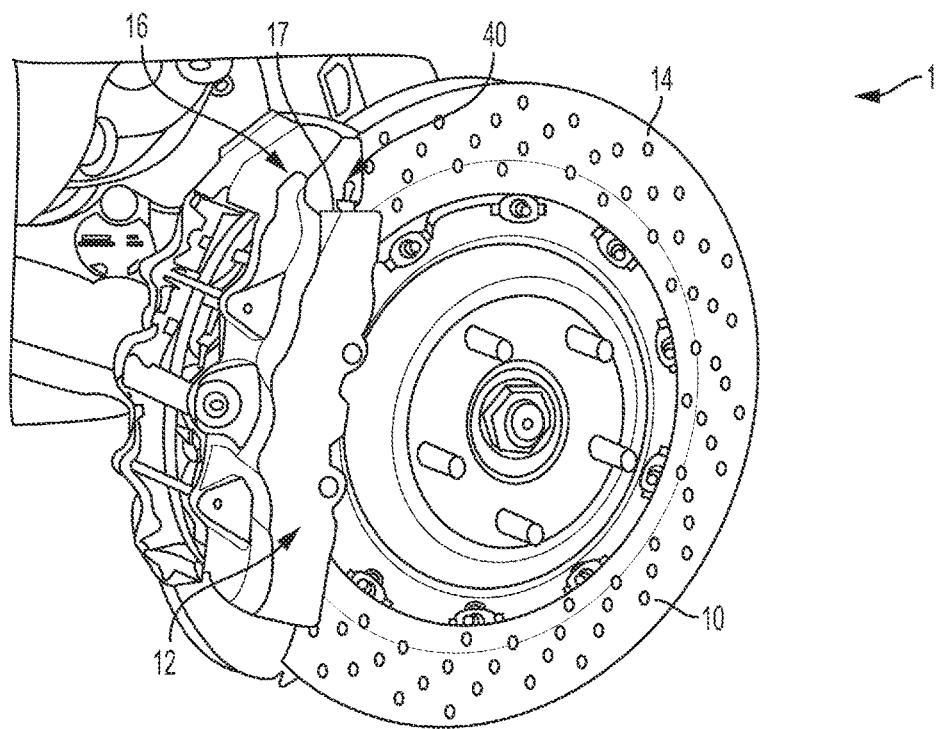
FIG. 2 is a perspective view of a portion of a motor vehicle braking system incorporation a resettable sensor assembly in accordance with embodiments of the disclosure.

Braking system 10 includes a friction braking mechanism or disc brake assembly 12. The friction braking mechanism 12 is shown as a disc brake assembly in FIG. 2, but may also be a drum brake assembly, as is known in the art. The disc brake assembly 12 includes a rotor 14, typically connected to a road wheel (not shown) of the vehicle 1, such that the road wheel and the rotor rotate as a unit. The disc brake assembly 12 also includes a member 16, fixedly connected to a body structure (not shown) of the vehicle 1.

The member 16 may be any suitable device which requires temperature measurement and/or condition monitoring. For example, the member 16 may be, by way of non-limiting examples, a component of a gear box, a transmission, a fluid reservoir, a conduit, an engine, an axle, an oil pan, a coolant pipe, a brake caliper as shown in the Figures, and the like. However, the member 16 may also be useful for non-vehicular devices such as heating equipment, e.g., ovens, dryers, grinders, and the like; electrically-powered equipment, e.g., electric motors, timer switches, welding transformers, and welding guns; mechanical equipment, e.g., pulleys, elevators, and augers; and processing equipment, e.g., reactors, ovens, coolant pipes, conduits, valves, and conveyors.

The member or brake caliper 16 defines a hole 17 therein and includes a second plurality of threads 18 to receive and cooperate with a first plurality of threads (not shown) of a first sensor or resettable sensor assembly as will be described in greater detail below within the hole 17. The caliper 16 includes one or more pistons (not shown) and houses brake pad set 19.

The one or more pistons are energized by a hydraulic pressure to extend toward the rotor 14 during the operation of the friction braking mechanism 12. Brake pad set 19 typically includes two brake pads, with one brake pad arranged on each side of the rotor 14, such that the rotor 14 is sandwiched by the brake pads. Rotor 14 is squeezed by the brake pad set 19 when the one or more pistons are urged by the hydraulic pressure to extend toward the rotor 14. The hydraulic pressure is supplied at the brake caliper 16 via a non-compressible fluid delivered by a hydraulic passage 20 from a master brake cylinder 22.

The master brake cylinder 22 may act as a reservoir for the non-compressible fluid is connected to a brake actuator 24. As shown in FIG. 1, brake actuator 24 includes a pivoting brake pedal 26 acting via a mechanical linkage 27 to supply hydraulic pressure to the brake caliper 16. The brake pedal 26 is applied, i.e., depressed, by an operator of the vehicle 1 with a force F when slowing the vehicle is desired. Force F generated at the brake pedal 26 is employed to produce hydraulic pressure at the master brake cylinder 22, and in the hydraulic passage 20.

As known by those skilled in the art, a brake booster (not shown) is often employed to magnify the force F provided by the operator. Although brake actuator 24 is shown and described as including the brake pedal 26 with a mechanical linkage, any lever or button that is capable of generating hydraulic pressure, either via a mechanical action, or by an electromechanical connection (such as via a servomotor), may also be employed.

A second sensor 28 may be employed to sense displacement of the brake pedal 26 when the brake pedal 26 is depressed. Second sensor 28 may be similarly employed to sense displacement or the linkage 27 when brake pedal 26 is depressed. A third sensor 30 may be employed to sense hydraulic pressure supplied at brake caliper 16. The displacement data for brake pedal 26 from the second sensor 28 and the hydraulic pressure data from the third sensor 30 are communicated to a controller 32, such as an electronic brake control module employed in an anti-lock braking system. When employed together with the anti-lock braking system, third sensor 30 may be integrated into the controller 32. An indication system 34 may cooperate and be in communication with the controller 32 to provide notice of the system status.

Figure 3:
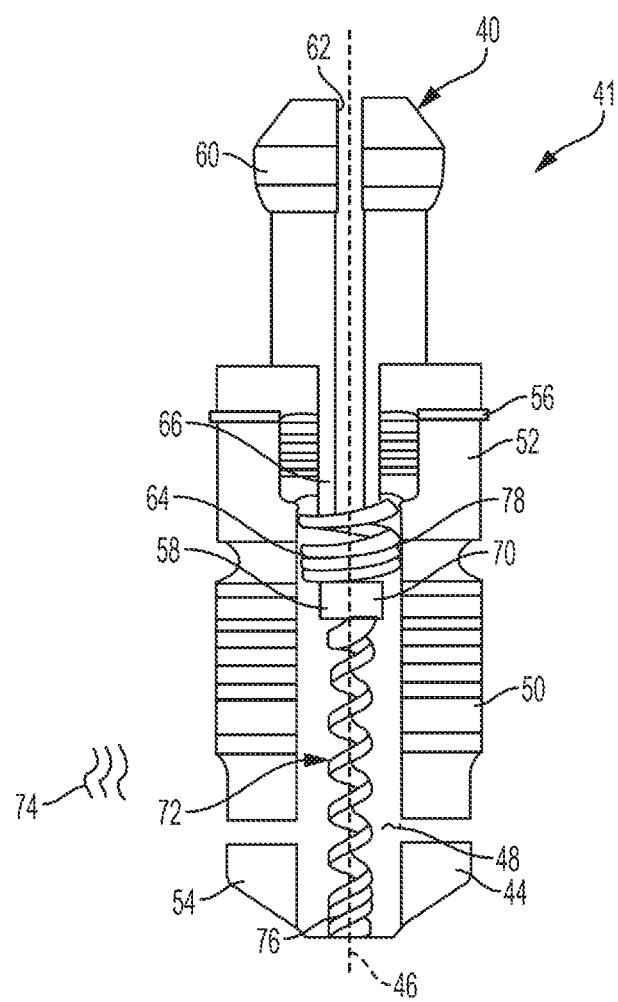
FIG. 3 is a schematic cross-sectional illustration of the resettable sensor assembly.

Referring to FIG. 3, wherein like reference numerals refer to like elements, a resettable sensor assembly 40 and resettable sensor system 41 are shown. The resettable sensor assembly 40 and resettable sensor system 41 operate passively, such as in response to temperature changes and without an additional electrical power source, and are useful for alerting an operator to a condition in which a temperature of a member such as brake caliper 16 or other device or fluid falls outside of a desired temperature range.

The resettable sensor assembly 40 and resettable sensor system 41 are automatically resettable once the condition has ended. For example, once the temperature of the device or fluid again returns to within the desired temperature range. Therefore, the resettable sensor assembly 40 and resettable sensor system 41 may be useful for temperature monitoring for manufacturing and vehicle applications. The resettable sensor assembly may also be useful for temperature monitoring in non-vehicle applications, including, but not limited to cosmetic, beer and wine manufacturing or the like. Alternatively, the resettable sensor assembly 40 and resettable sensor system 41 may be manually reset.

The resettable sensor assembly 40 and resettable sensor system 41 may be useful for vehicle applications such as oil temperature monitoring, coolant temperature monitoring, transmission temperature monitoring, axle fluid temperature monitoring, brake caliper fluid monitoring, and the like. However, the resettable sensor assembly 40 and resettable sensor system 41 may also be useful for non-vehicular temperature monitoring applications such as heating equipment, ovens, dryers, and grinders that may repeatedly cycle between temperature extremes.

It may also be useful for electrically-powered equipment, such as electric motors, timer switches, welding transformers, and welding guns that may be subjected to varying temperatures during operation. Further, mechanical equipment, such as pulleys, elevators, and augers that may be subject to frictional heating during operation may use the resettable sensor assembly and resettable sensor system. Additionally, processing equipment, such as reactors, ovens, coolant pipes, conduits, valves, and conveyors that may likewise operate in varying environmental and thermal conditions.

The resettable sensor assembly 40 includes an elongate valve body 44 having a longitudinal axis 46. The elongate valve body 44 defines a cavity 48 extending at least partially therein along the longitudinal axis 46. The valve body 44 includes a first plurality of threads 50 disposed about the longitudinal axis 46 configured to releasably secure the second plurality of threads 18 in a hole 17 on the brake caliper 16. The valve body 44 may be formed from a thermally-conductive material, such as a metal like brass or copper, according to the operating conditions of the resettable sensor assembly 40.

The first plurality of threads 50 may form a screw such that the valve body 44 may threadably attach to the second plurality of threads 18 in the hole 17 on brake caliper 16. That is, the elongate valve body 44 of the resettable sensor assembly 40 may be screwed or threaded into the hole 64. The valve body 44 may have a generally cylindrical shape and may protect other components of the resettable sensor assembly 40 from contaminants during operation. The elongate valve body 44 may have a proximal end 52 and a distal end 54 spaced apart from the proximal end 52 along the longitudinal axis 46.

Although not shown, in one embodiment, the cavity 48 may be configured for containing a fluid (not shown) such as an oil-based fluid, a coolant, ambient air, and the like. For example, the fluid may be an oil-based brake fluid. The fluid may enhance or decrease heat transfer to various components of the resettable sensor assembly 40, as set forth in more detail below. By way of a non-limiting example, for this embodiment, the valve body 44 may define a channel therein. The channel may be configured to receive a seal 56, such as an O-ring formed from an elastomeric material. By way of a non-limiting example, the channel may be defined along a perimeter of the valve body 44 and may have any desired shape or configuration.

The resettable sensor assembly 40 may also include a support member 58 received within and reversibly translatable within the cavity 48 of the elongate valve body 44 along the longitudinal axis 46. The support member 58 may be formed from a lightweight and non-conductive material such as a plastic or a composite. The support member 58 may have a generally cylindrical shape and may include a member 60 that may slide back and forth within the cavity 48.

A housing 60 is disposed adjacent and movably engages the proximal end 52 of the valve body 44. Housing 60 may include a channel 62 that is in fluid communication with cavity 48 of the elongate valve body 44. In one embodiment of the disclosure, housing 60 forms a bleed valve nipple configured to allow brake fluid or air to pass therethrough. Housing 60 may be formed of a variety of materials. Housing 60 may threadably engage the elongate valve body 44. Alternatively, housing 60 may be adjustably positioned relative to valve body 44 by another form of attachment, such as adhesive, magnetic attachment and the like.

The housing 60 may be formed of a conductive material and cooperate with the elongate valve body 44 and include at least one electrical contact 64. The housing 60 may be characterized as an electrical switch which may form a portion of an electrical circuit. The housing 60 may be a normally-open electrical switch in which a default state of the housing 60 is such that electrical current may not pass through the at least one electrical contact 64 to complete an electrical circuit. Alternatively, the housing 60 may be a normally-closed electrical switch in which a default state of the housing 60 is such that electrical current may pass through the at least one electrical contact 64 to complete an electrical circuit.

As best described with reference to FIG. 3, the channel 62 of housing 60 may define a fluid flow passage extending at least partially through the bleeder valve housing 60 along the longitudinal axis 46. The at least one electrical contact 64 may be disposed within or adjacent to the chamber 62. It is contemplated that a portion 66 of housing 60 may extend into the cavity 48 in the elongate valve body 44. The at least one electrical contact 64 may be in electrical communication with a terminal or other electrical connection operatively connected to the housing 60, which may in turn connect to a transmission wire, flag and/or processor to communicate with a controller or other vehicle diagnostic system.

In one embodiment, the housing 60 may include only one electrical contact 64 that is configured for connecting to one transmission wire at the terminal. Further, the resettable sensor assembly 40 may communicate data regarding the state of operation of the resettable sensor assembly 40 independently of control of any diagnostic system or controller. As such, the resettable sensor assembly 40 may be a passive sensor that is not controlled by a system or controller but is activated or actuated in response to the occurrence of a condition as will be described in greater detail below.

The resettable sensor assembly 40 also includes a plate 70 at least disposed in cavity 48 that may be in contact with the at least one electrical contact 64. The plate 70 may be shaped as a disc and may be formed from an electrically-conductive material such as brass or copper. In one embodiment of the disclosure, plate 70 is disposed within the cavity 48 and operatively connected to an actuator element 72. Alternatively, plate 70 may be disposed on the support member 58 operatively connected to the actuator element 72 and translatable through the cavity in response to the movement of the actuator element 72.

In one embodiment of the disclosure, the actuator element 72 is configured to translate the plate 70 via the support member 58 along the longitudinal axis 46 between a first position in which the plate 70 contacts the at least one electrical contact 64, and a second position in which the plate 70 is spaced apart from the at least one electrical contact 64. For embodiments in which the housing 60 includes a plurality of electrical contacts 64, the plate 70 is disposed in contact with the plurality of electrical contacts 64 when the support member 58 is disposed in the first position, and is spaced apart from the plurality of electrical contacts 64 when the support member 58 is disposed in the second position.

The actuator element 72 is formed from a shape memory alloy that is transitionable between an austenite crystallographic phase and a martensite crystallographic phase in response to a thermal activation signal to thereby translate the support member 58 and/or the plate 70 between the first position and the second position.

The shape memory alloy is transitionable in response to the thermal activation signal 74 between a first temperature-dependent state and a second temperature-dependent state. In particular, the actuator element 72 may be configured as a first resilient member 76 and may abut the support member 58 and the valve body 44. Therefore, as set forth in more detail below, the actuator element 72 may actuate or translate the support member 58 and/or the plate 70 by transitioning between the first temperature-dependent state and the second temperature-dependent state such that the support member 58 and/or the plate 70 slide along the longitudinal axis 46 within the cavity 48.

The brake caliper 16 may be configured for providing the thermal activation signal 74 to the actuator element 72. That is, the brake caliper 16 may heat up and increase in temperature during operation and transfer heat to the valve body 44 and the actuator element 72 by way of conduction. Therefore, the resettable sensor assembly 40 may detect when a temperature excursion occurs, such as when an operating temperature of the brake caliper 16 exceeds or falls below the transformation temperature of the shape memory alloy.

As used herein, the terminology "shape memory alloy" refers to alloys that exhibit a shape memory effect and have the capability to quickly change properties in terms of stiffness, spring rate, and/or form stability. That is, the shape memory alloy may undergo a solid state crystallographic phase change via molecular or crystalline rearrangement to shift between the martensite crystallographic phase, i.e., "martensite", and the austenite crystallographic phase, i.e., "austenite". Stated differently, the shape memory alloy may undergo a displacive transformation rather than a diffusional transformation to shift between martensite and austenite. A displacive transformation is defined as a structural change that occurs by the coordinated movement of atoms or groups of atoms relative to neighboring atoms or groups of atoms. In general, the martensite phase refers to the comparatively lower-temperature phase and is often more deformable than the comparatively higher-temperature austenite phase.

The temperature at which the shape memory alloy begins to change from the austenite crystallographic phase to the martensite crystallographic phase is known as the martensite start temperature, $M_s$. The temperature at which the shape memory alloy completes the change from the austenite crystallographic phase to the martensite crystallographic phase is known as the martensite finish temperature, $M_f$. Similarly, as the shape memory alloy is heated, the temperature at which the shape memory alloy begins to change from the martensite crystallographic phase to the austenite crystallographic phase is known as the austenite start temperature, $A_s$. The temperature at which the shape memory alloy completes the change from the martensite crystallographic phase to the austenite crystallographic phase is known as the austenite finish temperature, $A_f$.

The shape memory alloy may have any suitable form, i.e., shape. For example, the actuator element 72 may be configured as a shape-changing element such as a wire (not shown), spring, tape, band, continuous loop, and combinations thereof. Further, the shape memory alloy may have any suitable composition. In particular, the shape memory alloy may include in combination an element selected from the group of cobalt, nickel, titanium, indium, manganese, iron, palladium, zinc, copper, silver, gold, cadmium, tin, silicon, platinum, and gallium.

For example, suitable shape memory alloys may include nickel-titanium based alloys, nickel-aluminum based alloys, nickel-gallium based alloys, indium-titanium based alloys, indium-cadmium based alloys, nickel-cobalt-aluminum based alloys, nickel-manganese-gallium based alloys, copper based alloys (e.g., copper-zinc alloys, copper-aluminum alloys, copper-gold alloys, and copper-tin alloys), gold-cadmium based alloys, silver-cadmium based alloys, manganese-copper based alloys, iron-platinum based alloys, iron-palladium based alloys, and combinations of one or more of each of these combinations. The shape memory alloy can be binary, ternary, or any higher order so long as the shape memory alloy exhibits a shape memory effect, e.g., a change in shape orientation, damping capacity, and the like. Generally, the shape memory alloy may be selected according to desired operating temperatures of the resettable sensor assembly 40. In one specific example, the shape memory alloy may include nickel and titanium.

Therefore, the actuator element 72 formed from the shape memory alloy may be characterized by a cold state, i.e., when a temperature of the shape memory alloy is below the martensite finish temperature, $M_f$, of the shape memory alloy. Likewise, the actuator element 72 formed from the shape memory alloy may also be characterized by a hot state, i.e., when the temperature of the shape memory alloy is above the austenite finish temperature, $A_f$, of the shape memory alloy. In addition, although not shown, the resettable sensor assembly 40 may include a plurality of actuator elements 72 formed from the shape memory alloy.

The number of actuator elements 72 may be selected according to a desired stability of the resettable sensor assembly 40 and/or a force required to translate the support member 58 and/or the plate 70. In one embodiment, the fluid (not shown) may be retained within the cavity 48 by a seal or the like and may modify heat transfer to the actuator element 72 to increase or amplify the magnitude of the thermal activation signal 74, such that the actuator element 72 may change shape and/or stiffness more quickly. Conversely, the fluid may decrease the magnitude of the thermal activation signal 74 such that the actuator element 72 may change shape and/or stiffness more slowly or according to a desired schedule.

The actuator element 72 may contract in length and/or compress in response to the thermal activation signal 74 to translate the support member 58 and/or the plate 70 along the longitudinal axis 46 in a first direction 52 as the actuator element 72 transitions from the austenite crystallographic phase to the martensite crystallographic phase. That is, the actuator element 72 may push on the support member 58 and/or the plate 70 so that the support member 58 and/or the plate 70 slides along the longitudinal axis 46 towards the housing 60. The plate 70 is placed in contact with the housing 60 with the at least one contact 64 to complete an electrical circuit which will be communicated to a controller or vehicle diagnostic system through a wire in electrical communication with a terminal cooperating with the resettable sensor assembly.

The resettable sensor assembly 40 may further include a second resilient member 78. The second resilient member 78 may be at least partially disposed about the portion 66 of the housing 60 and extend into the cavity 48 to engage the plate 70 and/or support member 58. That is, the second resilient member 78 may be a bias spring and may wrap around a portion 66 of the housing 60. More specifically, the second resilient member 78 may translate the support member 58 along the longitudinal axis 46 in a second direction 56 that is opposite the first direction 52 as the actuator element 72 transitions from the martensite crystallographic phase to the austenite crystallographic phase. Therefore, as the shape memory alloy cools, the second resilient member 78 may push the support member 58 in the second direction 56, e.g., away from the housing 60, to thereby reset the resettable sensor assembly 40 to an initial or default position.

The shape memory alloy may be selected to change shape and/or stiffness at a specific transformation temperature, $T_{trans}$. For example, the transformation temperature may be selected to correspond to a suitable operating temperature range of the device or brake mechanism 12 for which the resettable sensor assembly 40 measures or monitors temperature excursions that fall outside, such as above or below, a desired operating temperature range. It is also contemplated that the second resilient member 78 may be formed of a shape memory alloy with distinct shape and/or stiffness parameters for use with the resettable sensor assembly 40.

For example, as the actuator element 72 transitions from the austenite crystallographic phase to the martensite crystallographic phase, i.e., as the shape memory alloy cools from an excursion temperature that is greater than the transformation temperature to a temperature that is lower than the transformation temperature, the actuator element 72 may expand and push against the support member 58 and/or the plate 70 such that the support member 58 and/or the plate 70 translates along the longitudinal axis 46 towards the housing 60. As the support member 58 and/or the plate 70 translate, the support member 58 and/or the plate 70 may also compress the second resilient member 78 such that the plate 70 contacts the at least one electrical contact 64.

Depending upon whether the housing 60 is configured as a normally-open or a normally-closed electrical switch, the plate 70 may complete or disrupt an electrical circuit so that an output signal (not shown) is transmitted through the terminal to a wire to an output signal such as a visual signal, such as a flag or a color change, or an indicator, such as an auditory signal like an alarm bell, or a combination thereof. For example, when the housing 60 is configured as a normally-open electrical switch, the electrical circuit may close when the shape memory alloy is heated to a temperature above the transformation temperature so that an indicator signal is presented to an operator. Alternatively, when the housing 60 is configured as a normally-closed electrical switch, the electrical circuit may open when the shape memory alloy is heated to a temperature above the transformation temperature so that an indicator signal is no longer presented to an operator.

For example, during operation of the resettable sensor assembly 40, once the operating temperature of the brake caliper 16 has warmed to a temperature at or greater than the transformation temperature such as when the actuator element 72 transitions from the martensite crystallographic phase to the austenite crystallographic phase, the actuator element 72 may contract such that the second resilient member 78 overcomes the spring force of the first resilient member 76 and pushes against the member 60 of the support member 58 to thereby translate the support member 58 in the second direction 56, away from the housing 60. As such, the plate 70 also translates away from the at least one electrical contact 64 such that the electrical circuit is interrupted or opened to thereby reset the housing 60 to the open state.

Conversely, the resettable sensor assembly 40 may be arranged in an opposite configuration. For example, as the actuator element 72 transitions from the austenite crystallographic phase to the martensite crystallographic phase, such as when the shape memory alloy cools to an excursion temperature that is lower than the transformation temperature, the actuator element 72 may expand and push against the support member 58 and/or the plate 70 such that the support member 58 and/or the plate 70 translate along the longitudinal axis 46 towards the housing 60. As the support member 58 and/or the plate 70 translate, the support member 58 and/or the plate 70 may also expand the second resilient member 78 such that the plate 70 contacts the at least one electrical contact 64 to close the electrical circuit.

Figure 4:
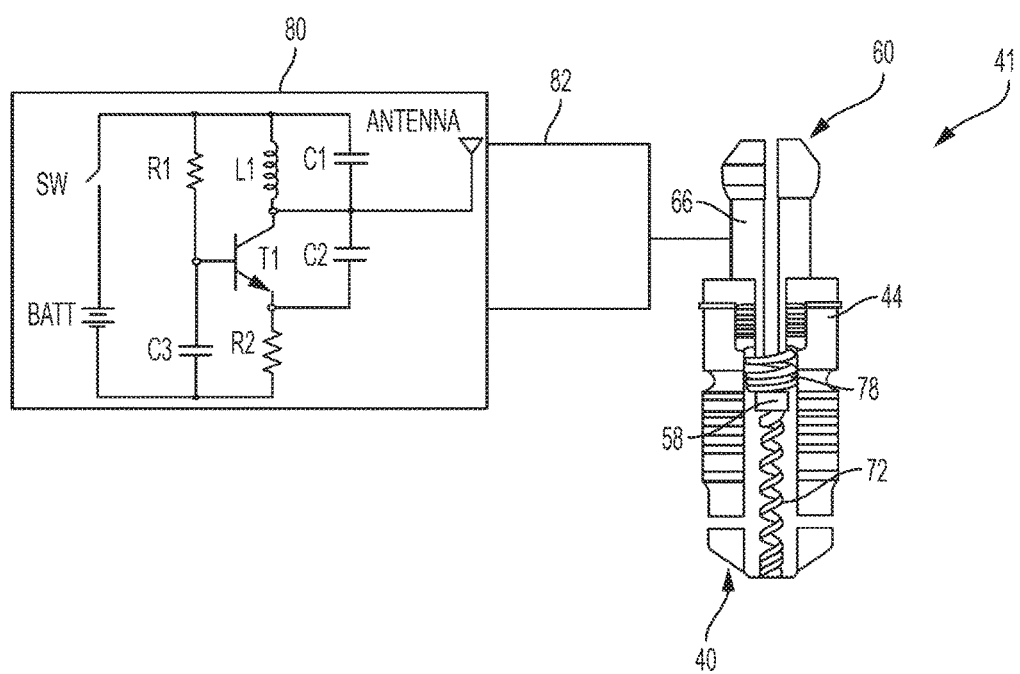
FIG. 4 is a schematic illustration of the resettable sensor assembly coupled to a wireless transmitter for use in accordance with embodiments of the disclosure.

As described with reference to FIG. 4, the resettable sensor assembly 40 may operate wirelessly. For example, the resettable sensor assembly 40 may further include a wireless transmitter 80 electrically connected to the at least one electrical contact 64 and a battery 82 electrically connected to the wireless transmitter 80. For example, the wireless transmitter 80 may be an oscillator as shown in FIG. 4.

Activation of the shape memory alloy (SW) may power the oscillator on and off. When the oscillator is off, no power may be necessary for signal transmission. The signal may be received by a receiver that is tuned to a frequency that is the same frequency as the oscillator. That is, the wireless transmitter 80 may have the same frequency as the receiver. The battery 82 may be a thermopile that may generate electricity from a temperature difference between the cavity 48 and the valve body 44. It is to be appreciated that other electrical circuits and/or equipment may be employed for wireless communication. For example, the resettable sensor assembly 40 may operate wirelessly across networks, electrical circuits, devices, and software associated with Bluetooth® technology, Wi-Fi technology, ZigBee® technology, and the like.

The resettable sensor assembly 40 and resettable sensor system 41 may provide cost-effective and energy-efficient, autonomous monitoring. The resettable sensor assembly 40 and resettable sensor system 41 may provide a remote, device-specific overheat signal to warn of temperature excursions beyond or below a desired level or range. The resettable sensor assembly 40 is compact and lightweight and can monitor temperature excursions of equipment having small dimensions or tight manufacturing tolerances. Further, the resettable sensor assembly 40 and resettable sensor system 41 are durable and automatically resettable, provide a combined sensor and actuator, and may be tuned according to a desired temperature alarm limit.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A resettable sensor assembly comprising:
    an elongate valve body having a longitudinal axis and defining a cavity therein, wherein the body includes a first plurality of threads disposed about the longitudinal axis;
    a housing at least partially disposed within and cooperating with the elongate valve body, wherein the housing is formed of a conductive material and includes at least one electrical contact;
    a support member disposed within the elongate valve body cavity and translatable within the cavity along the longitudinal axis;
    a plate cooperating with the support member disposed within the elongate valve body cavity and movable to communicate with the at least one electrical contact; and
    an actuator element configured for translating the plate along the longitudinal axis between:
        a first position in which the plate contacts the at least one electrical contact; and
        a second position in which the plate is spaced apart from the at least one electrical contact;
    wherein the actuator element is formed from a shape memory alloy that is transitionable between an austenite crystallographic phase and a martensite crystallographic phase in response to a thermal activation signal to thereby translate the plate between the first position and the second position.

2. The resettable sensor assembly of claim 1 wherein the first plurality of threads of the elongate valve body are sized to releasably engage a second plurality of threads disposed in a hole of a brake caliper of a vehicle braking system.

3. The resettable sensor assembly of claim 2 wherein the actuator element translates the support member along the longitudinal axis in a first direction as the actuator element transitions from the austenite crystallographic phase to the martensite crystallographic phase.

4. The resettable sensor assembly of claim 3 wherein the second resilient member translates the support member along the longitudinal axis in a second direction that is opposite the first direction as the actuator element transitions from the martensite crystallographic phase to the austenite crystallographic phase.

5. The resettable sensor assembly of claim 2 further comprising a second resilient member disposed about the housing and in contact with the support member.

6. The resettable sensor assembly of claim 2 wherein the housing includes a plurality of electrical contacts spaced apart from one another, and further wherein the plate is disposed in contact with the plurality of electrical contacts when the plate is disposed in the first position, and is spaced apart from the plurality of electrical contacts when the plate is disposed in the second position.

7. The resettable sensor assembly of claim 2 further comprising:
    a wireless transmitter electrically connected to the at least one electrical contact; and
    a battery electrically connected to the wireless transmitter.

8. The resettable sensor assembly of claim 2 wherein the housing defines at least one terminal cooperating with a wire and electrically connected to the at least one electrical contact.

9. The resettable sensor assembly of claim 1 further comprising a second resilient member disposed about the housing and in contact with the support member.

10. The resettable sensor assembly of claim 9 wherein the second resilient member translates the support member along the longitudinal axis in a second direction that is opposite the first direction as the actuator element transitions from the martensite crystallographic phase to the austenite crystallographic phase.

11. The resettable sensor assembly of claim 1 wherein the actuator element operatively engages the elongate valve body and the support member.

12. The resettable sensor assembly of claim 1 wherein the actuator element is configured as a first resilient member.

13. The resettable sensor assembly of claim 1 wherein the actuator element translates the support member along the longitudinal axis in a first direction as the actuator element transitions from the austenite crystallographic phase to the martensite crystallographic phase.

14. The resettable sensor assembly of claim 1 wherein the housing includes a plurality of electrical contacts spaced apart from one another, and further wherein the plate is disposed in contact with the plurality of electrical contacts when the plate is disposed in the first position, and is spaced apart from the plurality of electrical contacts when the plate is disposed in the second position.

15. The resettable sensor assembly of claim 1 wherein the housing defines at least one terminal cooperating with a wire and electrically connected to the at least one electrical contact.

16. The resettable sensor assembly of claim 1 further comprising:
    a wireless transmitter electrically connected to the at least one electrical contact; and
    a battery electrically connected to the wireless transmitter.

17. A vehicle comprising:
    a braking system for decelerating the vehicle, the braking system including:
    a friction braking mechanism including a brake caliper;
    a brake actuator for actuating the friction braking mechanism via a hydraulic pressure;
    a controller; and
    a resettable sensor assembly in communication with the controller including:
        an elongate valve body having a longitudinal axis and defining a cavity therein, wherein the body includes a first plurality of threads disposed about the longitudinal axis,
        a housing at least partially disposed within and cooperating with the elongate valve body, wherein the housing is formed of a conductive material and includes at least one electrical contact,
        a support member disposed within the elongate valve body cavity and translatable within the cavity along the longitudinal axis,
        a plate cooperating with the support member disposed within the elongate valve body cavity and movable to communicate with the at least one electrical contact, and
        an actuator element having a first resilient member to operatively engage the elongate valve body and the support member and configured for translating the plate along the longitudinal axis between a first position in which the plate contacts the at least one electrical contact and a second position in which the plate is spaced apart from the at least one electrical contact and a second resilient member disposed about the housing and in contact with the support member, wherein the actuator element is formed from a shape memory alloy that is transitionable between an austenite crystallographic phase and a martensite crystallographic phase in response to a thermal activation signal to thereby translate the plate between the first position and the second position.

18. The vehicle of claim 17 wherein the actuator element translates the support member along the longitudinal axis in a first direction as the actuator element transitions from the austenite crystallographic phase to the martensite crystallographic phase.

19. The vehicle of claim 17 wherein the second resilient member translates the support member along the longitudinal axis in a second direction that is opposite the first direction as the actuator element transitions from the martensite crystallographic phase to the austenite crystallographic phase.

20. A resettable sensor assembly for use with a vehicle braking system comprising:

an elongate valve body having a longitudinal axis and defining a cavity therein, wherein the body includes a first plurality of threads disposed about the longitudinal axis;

a housing at least partially disposed within and cooperating with the elongate valve body, wherein the housing is formed of a conductive material and includes at least one electrical contact;

a support member disposed within the elongate valve body cavity and translatable within the cavity along the longitudinal axis;

a plate cooperating with the support member disposed within the elongate valve body cavity and movable to communicate with the at least one electrical contact; and an actuator element having a first resilient member to operatively engage the elongate valve body and the support member and configured for translating the plate along the longitudinal axis between:

a first position in which the plate contacts the at least one electrical contact; and a second position in which the plate is spaced apart from the at least one electrical contact;

wherein the actuator element is formed from a shape memory alloy that is transitionable between an austenite crystallographic phase and a martensite crystallographic phase in response to a thermal activation signal to thereby translate the plate between the first position and the second position.

\* \* \* \* \*